Patented Aug. 13, 1935

2,010,854

UNITED STATES PATENT OFFICE 2,010,854

TREATMENT OF TEXTILE MATERIALS

George Holland Ellis and Henry Charles Olpin, Spondon, near Derby, England, assignors to Celanese Corporation of America, a corporation of Delaware No Drawing. Application April 14, 1933, Serial No. 666,171. In Great Britain May 4, 1932

8 Claims. (Cl. 8—5)

This invention relates to the colouration of cellulose ester and ether materials, and more particularly to the production of readily dischargeable black shades thereon.

It is well known that the production on cellulose esters and ethers of black shades exhibiting both good fastness properties and ease of discharge is a matter of considerable difficulty. Of the methods for the production of black shades on cellulose esters and ethers, the best results, from the point of view of fastness and appearance are perhaps obtainable by means of aniline black or by azoic methods from suitable diazotizable bases and coupling components. The aniline black colourations cannot however be discharged by any known method, and the azoic blacks, when of sufficient depth for commercial requirements, cannot in general be satisfactorily discharged.

We have now found that satisfactory black shades characterized by good fastness and great ease of discharge may be produced on cellulose ester or ether materials by applying both a diazotizable base capable of yielding navy blue or black shades upon development, and a yellow, orange or red dyestuff or mixture of dyestuffs resistant to diazotization, and thereafter diazotizing and coupling with a suitable coupling component. The diazotizable base need only be applied in such proportion as is insufficient, in the absence of the yellow, orange or red dyestuff or dyestuff mixture, to yield a full black shade.

Thus, a mixture of para-amino-benzene-azo-dimethyl aniline and an orange dyestuff may be applied to cellulose acetate material, and the latter diazotized and developed with $\beta$-oxy naphthoic acid. In this manner there may be obtained black shades exhibiting both good fastness properties and great ease of discharge with zinc formaldehyde sulphoxylate or other reducing discharging agents. Further, the process is simple of execution, involving no further manipulation than is normally required in the production of colourations by azoic methods.

As examples of suitable diazotizable bases may be mentioned, in addition to para-amino-benzene-azo-dimethyl aniline, other amino-benzene-azo - dialkyl or alkyl - aralkyl - anilines. Other amino-azo compounds may also be employed, for example monoamino azo compounds e. g. benzene-azo-$\alpha$-naphthylamine or naphthalene-azo-$\alpha$-naphthylamine or their nuclear substitution products, such as ortho-methoxy- or ortho-ethoxy-benzene-azo-$\alpha$-naphthylamine, or di-amino azo compounds e. g. diamino-azo benzene or its nuclear substitution products. Dianisidine and similar diamines yielding blue to black shades when diazotized and coupled with $\beta$-naphthol, $\beta$-oxynaphthoic acid and the like have also been found of value as diazotizable bases. As regards developers, most satisfactory results have been obtained with $\beta$-oxy naphthoic acid, both as regards the shades obtained and the ease with which they may be discharged. The nature and proportion of the yellow, orange or red dyestuff or dyestuff mixture applied in conjunction with the diazotizable base, will vary according to the character of the latter and the precise shade required. With the above-mentioned para-amino-benzene-azo-dimethyl aniline, using $\beta$-oxy naphthoic acid as the developer, very good blacks are obtainable with an orange dyestuff, or a mixture of a yellow or orange dyestuff with a red dyestuff. In practice very satisfactory results may be obtained by using a mixture of the yellow dyestuff benzene-azo-benzene-azo-phenol with the red dyestuff 4-nitro-2-methoxy-benzene-azo-dimethyl- or di-ethyl-aniline. Very satisfactory results may be obtained by applying to the material a mixture of about 9 parts of the diazotizable base, 1.2 parts of the yellow dyestuff and 1.5 parts of the red dyestuff.

The yellow, orange or red shading dyestuffs employed may be either water-soluble or water-insoluble compounds. Preferably, colouring matters of the azo series are employed in view of their ease of discharge, though dischargeable dyestuffs of other series may be utilized if desired.

The diazotizable bases and the yellow, orange, etc. colouring matters are preferably applied to the material in admixture, the diazotizable bases and the colouring matters, when insoluble, being conveniently in the form of aqueous suspensions or dispersions. Such suspensions or dispersions may be prepared in any convenient manner and with the aid of any desired dispersing agents and/or protective colloids. As examples of suitable dispersing agents reference may be made to those mentioned in U. S. Patents Nos. 1,618,413, 1,618,414, 1,694,413, 1,690,481, 1,803,008, 1,840,572, 1,716,721, and 1,928,647 and British Patent No. 323,728.

The diazotizable bases and yellow, orange etc. colouring matters may be applied to the materials either by dyeing, padding, all-over printing or other method of uniform application, or by printing, stencilling or other mode of local application. The diazotization and subsequent coupling are conveniently effected in separate baths. If desired however the coupling component may be applied simultaneously with the diazotizable base and yellow or orange colouring matter, diazotization and coupling then being effected by treatment with a nitrous acid solution followed, if necessary, by an alkaline treatment.

The black shades obtainable in accordance with the invention are readily dischargeable by means of reducing discharging agents and in particular by zinc formaldehyde sulphoxylate, for example the product sold under the trade name Decrolin. The discharging agents may be applied in conjunction with swelling or softening agents for the cellulose ester or ether materials. Particularly good results are obtainable however when zinc formaldehyde sulphoxylate is utilized in conjunction with diethylene glycol, triethylene glycol, thiodiglycol or other compounds specified in British Patent No. 400,643, and especially with one of these compounds in admixture with ethyl lactate.

Where coloured discharges are desired there may be incorporated in the discharge compositions colouring matters which are resistant to the discharging agent and have affinity for or are capable of being fixed on the materials. Any desired colouring matter having these properties may be employed. Thus, for example, there may be employed vat dyestuffs, e. g. anthraquinone or indigoid vat dyestuffs or leuco compounds or esterified leuco compounds of vat dyestuffs, or resistant azo dyestuffs, e. g. the pyrazolone azo dyestuffs of British Patents Nos. 346,751 and 380,061.

The following examples illustrate the invention without being in any way limitative:—

Example 1

A fabric consisting of cellulose acetate is dyed with 0.60% on the weight of the materials of p-amino-benzene-azo-dimethylaniline, 0.36% of benzene-azo-benzene-azo-phenol, and 0.04% of 4-nitro-2-methoxy-benzene-azo-dimethylaniline, the dyestuffs being applied in the form of aqueous dispersions. The materials are then subjected to a diazotization process and developed with $\beta$-oxy-naphthoic acid, an excellent full black being obtained. The materials are now printed with a discharge paste having the following composition:—

| | Parts |
|---|---|
| Zinc formaldehyde sulphoxylate—50% aqueous milled paste | 66 |
| Diethylene glycol | 10 |
| Ethyl lactate | 10 |
| Gum arabic 1:1 | 14 |
| | 100 | and dried, aged for 7 minutes in a Mather and Platt ager, and washed off and finished as desired. A good white discharge is obtained on a black ground.

Example 2

A cellulose acetate fabric is dyed with 0.5% on the weight of the goods of p-amino-benzene-azo-N-methyl-diphenylamine and 0.2% of benzene-azo-naphthalene-azo-phenol, the dyestuffs being applied in the form of aqueous dispersions. On diazotizing and developing with $\beta$-oxy-naphthoic acid, the material is coloured a full blue-black shade. The material is then printed with a discharge composition containing:—

| | Parts |
|---|---|
| Zinc formaldehyde sulphoxylate | 25 |
| Diethylene glycol | 10 |
| Ethyl lactate | 10 |
| p-acetoxy-benzene-azo-phenyl-methyl-pyrazolone (20% aqueous paste) | 10 |
| Gum arabic thickening | 45 |
| | 100 | and dried and steamed, for example in a Mather and Platt ager or a vat steamer, washed off, dried and finished as desirable or requisite. A bright yellow discharge is obtained on a blue-black ground.

Example 3

A cellulose acetate fabric is dyed with 0.6% on the weight of the goods of o-methoxy-benzene-azo-$\alpha$-naphthylamine, 0.1% of benzene-azo-naphthalene-azo-phenol, and 0.08% of 4-nitro-2-methoxy-benzene-azo-dimethylaniline and diazotized and developed with $\beta$-oxy-naphthoic acid in the usual manner. The black material is then printed with a printing paste having the following composition:—

| | Parts |
|---|---|
| Zinc formaldehyde sulphoxylate | 25 |
| Diethylene glycol | 10 |
| Ethyl lactate | 10 |
| Gum arabic thickening | 55 |
| | 100 | dried and aged, washed off and dried, when a parchment white discharge is obtained on a black ground.

The invention is of special value in the production of dischargeable black shades on cellulose acetate materials. It may however be applied to other cellulose ester or ether materials, for example materials consisting of or containing cellulose formate, propionate or butyrate, or ethyl or benzyl cellulose. Mixed materials comprising one or more of the foregoing cellulose derivatives in conjunction with other textile materials, for example cotton, silk, wool or regenerated cellulose artificial silk may similarly be coloured. Such additional fibres may be coloured in the same or contrasting shades, which may be dischargeable or nondischargeable, either before, at the same time, or after the colouration of the cellulose ester or ether material in accordance with the invention.

What we claim and desire to secure by Letters Patent is:—

1. Process for the production of dischargeable blacks on materials containing an organic derivative of cellulose, which comprises applying to the materials a dyestuff selected from the group consisting of dischargeable yellow, orange and red dyestuffs which are resistant to diazotization, and also a diazotizable amino base selected from the group consisting of diazotizable amino bases yielding navy blue shades and diazotizable amino bases yielding thin black shades, upon diazotization and development with a suitable coupling component, and thereafter effecting such diazotization and development.

2. Process for the production of dischargeable blacks on materials containing an organic derivative of cellulose, which comprises applying to the materials a dyestuff selected from the group consisting of dischargeable yellow, orange and red dyestuffs which are resistant to diazotization, simultaneously with a diazotizable amino base selected from the group consisting of diazotizable amino bases capable of yielding navy blue shades and diazotizable amino bases yielding thin black shades, upon diazotization and development with a suitable coupling component, and thereafter effecting such diazotization and development.

3. Process for the production of dischargeable blacks on materials containing an organic derivative of cellulose, which comprises applying to the materials a dyestuff selected from the group consisting of dischargeable yellow, orange and red dyestuffs which are resistant to diazotization, and also para-amino-benzene-azo-dimethyl-aniline, and thereafter diazotizing and coupling with β-oxy naphthoic acid.

4. Process for the production of dischargeable blacks on materials containing cellulose acetate, which comprises applying to the materials a dyestuff selected from the group consisting of dischargeable yellow, orange and red dyestuffs which are resistant to diazotization, and also a diazotizable amino base selected from the group consisting of diazotizable amino bases yielding navy blue shades and diazotizable amino bases yielding thin black shades, upon diazotization and development with a suitable coupling component, and thereafter effecting such diazotization and development.

5. Process for the production of dischargeable blacks on materials containing cellulose acetate, which comprises applying to the materials a dyestuff selected from the group consisting of dischargeable yellow, orange and red dyestuffs which are resistant to diazotization, simultaneously with a diazotizable amino base selected from the group consisting of diazotizable amino bases capable of yielding navy blue shades and diazotizable amino bases yielding thin black shades, upon diazotization and development with a suitable coupling component, and thereafter effecting such diazotization and development.

6. Process for the production of dischargeable blacks on materials containing cellulose acetate, which comprises applying to the materials a dyestuff selected from the group consisting of dischargeable yellow, orange and red dyestuffs which are resistant to diazotization, and also a para-amino-benzene-azo - dialkyl - aniline, and thereafter diazotizing and coupling with a coupling component selected from the group consisting of coupling components yielding navy blue shades and coupling components yielding thin black shades on coupling with the diazotized para-amino-benzene-azo-dialkyl-aniline.

7. Process for the production of dischargeable blacks on materials containing cellulose acetate, which comprises applying to the materials a dyestuff selected from the group consisting of dischargeable yellow, orange and red dyestuffs which are resistant to diazotization, and also para-amino-benzene-azo-dimethyl-aniline, and thereafter diazotizing and coupling with β-oxy-naphthoic acid.

8. Process for the production of dischargeable blacks on materials containing cellulose acetate, which comprises applying to the materials para-amino-benzene-azo-dimethyl - aniline, benzene-azo-benzene-azo-phenol and 4-nitro-2-methoxy-benzene-azo - dimethyl - aniline in substantially the proportions of 15:9:1, respectively, and thereafter diazotizing the para-amino-benzene-dimethyl-aniline and coupling with β-oxy naphthoic acid.

GEORGE HOLLAND ELLIS.
HENRY CHARLES OLPIN.